(12) United States Patent
Shibasaki et al.

(10) Patent No.: US 8,218,824 B2
(45) Date of Patent: Jul. 10, 2012

(54) SPATIAL INFORMATION DATABASE GENERATING DEVICE AND SPATIAL INFORMATION DATABASE GENERATING PROGRAM

(75) Inventors: Ryosuke Shibasaki, Tokyo (JP); Mitsuru Sato, Tokyo (JP)

(73) Assignees: Pasco Corporation, Tokyo (JP); The University of Tokyo, Tokyo (JP)

( * ) Notice: Subject to any disclaimer, the term of this patent is extended or adjusted under 35 U.S.C. 154(b) by 388 days.

(21) Appl. No.: 12/452,811

(22) PCT Filed: Jul. 23, 2008

(86) PCT No.: PCT/JP2008/001962
§ 371 (c)(1),
(2), (4) Date: Jan. 22, 2010

(87) PCT Pub. No.: WO2009/016807
PCT Pub. Date: Feb. 5, 2009

(65) Prior Publication Data
US 2010/0128920 A1    May 27, 2010

(30) Foreign Application Priority Data
Jul. 27, 2007   (JP) ................................ 2007-196004

(51) Int. Cl.
*G06K 9/00* (2006.01)
*G06F 17/30* (2006.01)
(52) U.S. Cl. ...................................... 382/108; 707/705
(58) Field of Classification Search .................. 382/100, 382/103, 108, 254, 285, 757, 782, 836; 700/98, 700/163; 702/152, 153; 707/687, 705; 715/976
See application file for complete search history.

(56) References Cited

U.S. PATENT DOCUMENTS
7,149,346 B2 * 12/2006 Oniyama ...................... 382/154
2007/0025595 A1  2/2007 Koizumi et al.

FOREIGN PATENT DOCUMENTS
| JP | A-2002-74323 | 3/2002 |
| JP | A-2002-251618 | 9/2002 |
| JP | A-2003-141575 | 5/2003 |
| JP | A-2003-156330 | 5/2003 |

(Continued)

OTHER PUBLICATIONS

International Preliminary Report on Patentability for International Patent Application No. PCT/JP2008/001962, mailed on Feb. 9, 2010.

(Continued)

*Primary Examiner* — Abolfazl Tabatabai
(74) *Attorney, Agent, or Firm* — Oliff & Berridge, PLC

(57) ABSTRACT

An orthographic projection creating unit creates an orthographic projection image from an optical image of an ground surface acquired by an optical camera, and a DSM generating unit generates a DSM from the orthographic projection image. A laser point group data generating unit generates three-dimensional point group data based on a laser measurement result of the ground surface by a laser measuring device. An object generating unit groups altitude data of the DSM and altitude data of the three-dimensional point group data for each of objects such as buildings. A synthesizing unit extracts the same objects from the grouped altitude data of the DSM and three-dimensional point group data, associates the objects with each other based on respective coordinate information thereof, and replaces altitude information of the optical image by high-accuracy altitude information of the three-dimensional point group data for each of the objects.

2 Claims, 5 Drawing Sheets

FOREIGN PATENT DOCUMENTS

| JP | A-2003-323640 | 11/2003 |
| JP | A-2005-077385 | 3/2005 |
| JP | A-2007-34808 | 2/2007 |

OTHER PUBLICATIONS

International Search Report issued in Application No. PCT/JP2008/001962; mailed on Sep. 2, 2008 (and translation).

McIntosh et al., "Improvement of Automatic DSM Generation Over Urban Areas Using Airborne Laser Scanner Data," *International Archives of Photogrammetry and Remote Sensing*, 2000, pp. 563-570, vol. 33, Part 133, Amsterdam.

Hongjian et al., "3D building reconstruction from aerial CCD image and sparse laser sample data," *Optics and Lasers in Engineering*, 2006, pp. 555-566, vol. 44.

Extended Search Report issued in corresponding European Application No. 08776871.9 dated Mar. 10, 2011.

Office Action issued in Japanese Patent Application No. 2007-196004 dated Jul. 26, 2011 (with translation).

Office Action issued in Chinese Patent Application No. 200880014312.0 dated Jun. 15, 2011 (with translation).

\* cited by examiner

SPATIAL INFORMATION DATABASE GENERATING DEVICE AND SPATIAL INFORMATION DATABASE GENERATING PROGRAM

TECHNICAL FIELD

The present invention relates to a spatial information database generating device and spatial information database generating program.

RELATED ART

Various methods for measuring a shape of a ground surface have conventionally been developed. For example, in measuring the shape of the ground surface using an aircraft or a satellite, plane positions are measured from images acquired by optical cameras, the images are photographed to overlap with one another, areas where the images overlap are subjected to stereoscopic processing, and altitude data of objects is acquired. In the following Patent Document 1, a technique for generating a is three-dimensional database of the ground surface from stereo images acquired by the optical cameras in the satellite is disclosed.

[Patent Document 1] Japanese Patent Application Laid-Open (JP-A) No. 2003-141575

However, in the related art, since the measurement is made using the optical cameras, measurement accuracy, particularly, measurement accuracy of altitude information cannot be improved.

In general, laser measurement is considered to improve the measurement accuracy of the altitude information. However, as described in paragraph 0009 of the Patent Document 1, a technology for extracting a group of objects (buildings, etc.) from a collection of altitude data collected by the laser measurement is not yet established in the related art. For this reason, the contours of the buildings needs to be manually designated based on photo images acquired by the optical cameras and the altitude data needs to be collected for each object as a unit. Even though a user desires to synthesize the objects and the photo images, data is collected by different equipments in the laser measurement and the measurement using the optical cameras. Therefore, observational coordinate systems are different from each other, and positioning cannot be easily conducted.

SUMMARY

Accordingly, the invention has been made in view of the problems in the related art, and it is an object of the invention to provide a spatial information database generating device and spatial information database generating program that can realize high measurement accuracy.

According to an aspect of the invention, a spatial information database generating device includes an optical image acquiring unit that acquires an optical image of an ground surface from a predetermined height; a laser measuring unit that acquires altitude information of an ground surface from a predetermined height by laser measurement; a coordinate acquiring unit that acquires coordinate information of a position where the optical image is acquired and a position where the laser measurement is performed; and a synthesizing unit that synthesizes the optical image and the altitude information acquired by the laser measurement based on similarity between altitude information included in the optical image and the altitude information acquired by the laser measurement and based on the coordinate information.

DESCRIPTION OF REFERENCE NUMERALS

Detailed Description

Hereinafter, an exemplary embodiment of the invention (hereinafter, referred to as embodiment) will be described with reference to the accompanying drawings.

Figure 1:
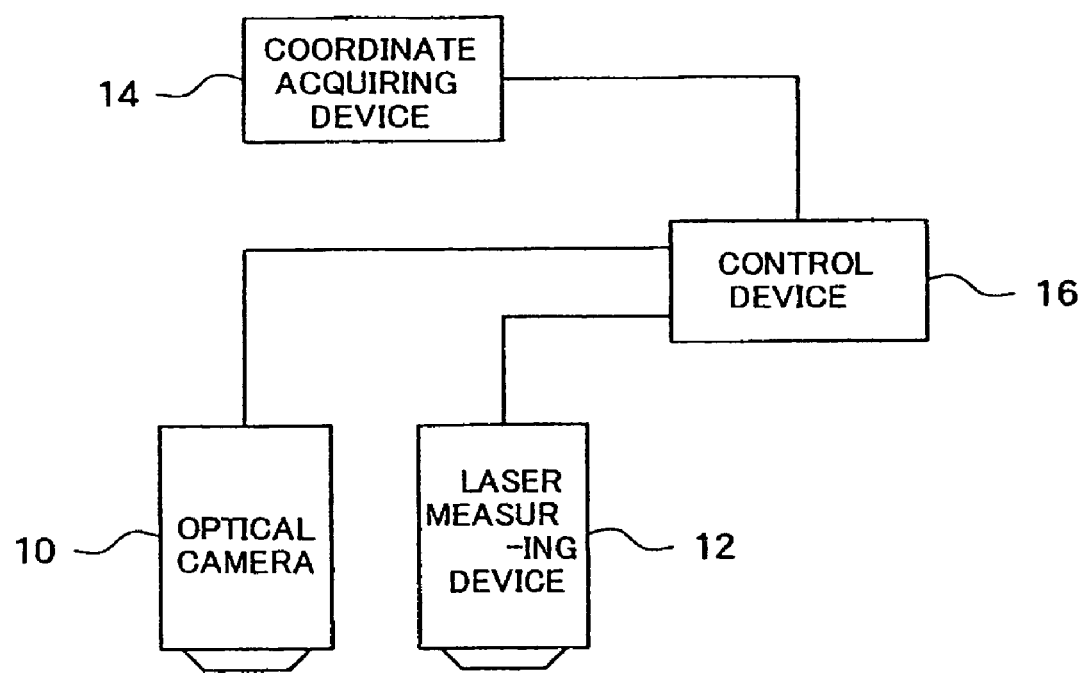
FIG. 1 is a diagram illustrating a configuration example of an embodiment of a spatial information database generating device according to the invention.

FIG. 1 illustrates a configuration example of an embodiment of a spatial information database generating device. In FIG. 1, the spatial information database generating device includes an optical camera 10, a laser measuring device 12, a coordinate acquiring device 14, and a control device 16. The spatial information database generating device according to this embodiment is configured to generate a spatial information database from data that is acquired by measuring an ground surface from an aircraft or a satellite.

The optical camera 10 is, for example, a digital camera, and acquires an optical image of the ground surface. In FIG. 1, only one optical camera 10 is illustrated, but the spatial information database generating device is configured such that optical images can be simultaneously acquired from two directions by two optical cameras to enable stereoscopic processing. As a result, optical image information that includes three-dimensional position information can be obtained.

The laser measuring device 12 includes a laser beam irradiating device and a laser beam receiving device. The laser measuring device 12 irradiates a laser beam onto the ground surface, calculates a distance from time taken for the laser beam to be reflected and returned, and acquires altitude information of the ground surface. In this case, a three-dimensional position of a measurement object can be measured by considering an irradiating angle at the time of irradiating the laser beam. Since the measurement is made at a predetermined number of points per a previously designated measurement range (for example, 2 points/m$^2$), a collection of point data that is called point group data (three-dimensional point group data), which are quantified three-dimensional position information and light reception strength (laser reflection strength), is acquired as a measurement result. The three-dimensional position information may includes coordinate information that is acquired by the coordinate acquiring device 14 to be described in detail below.

The coordinate acquiring device 14 includes a Global Positioning System (GPS) receiver and an Inertial Measurement Unit (IMU), and acquires coordinate information of a measurement position that is measured by the optical camera 10 and the laser measuring device 12. The acquired coordinate information is associated with the corresponding optical image and three-dimensional point group data.

The control device 16 is a data processing device such as a computer. The control device 16 calculates similarity between altitude information included in the optical image acquired by the optical camera 10 and altitude information acquired by the laser measuring device 12, and synthesizes the optical image and the altitude information based on the similarity and the coordinate information acquired by the coordinate acquiring device 14. The synthesizing process will be described in detail later.

Figure 2:
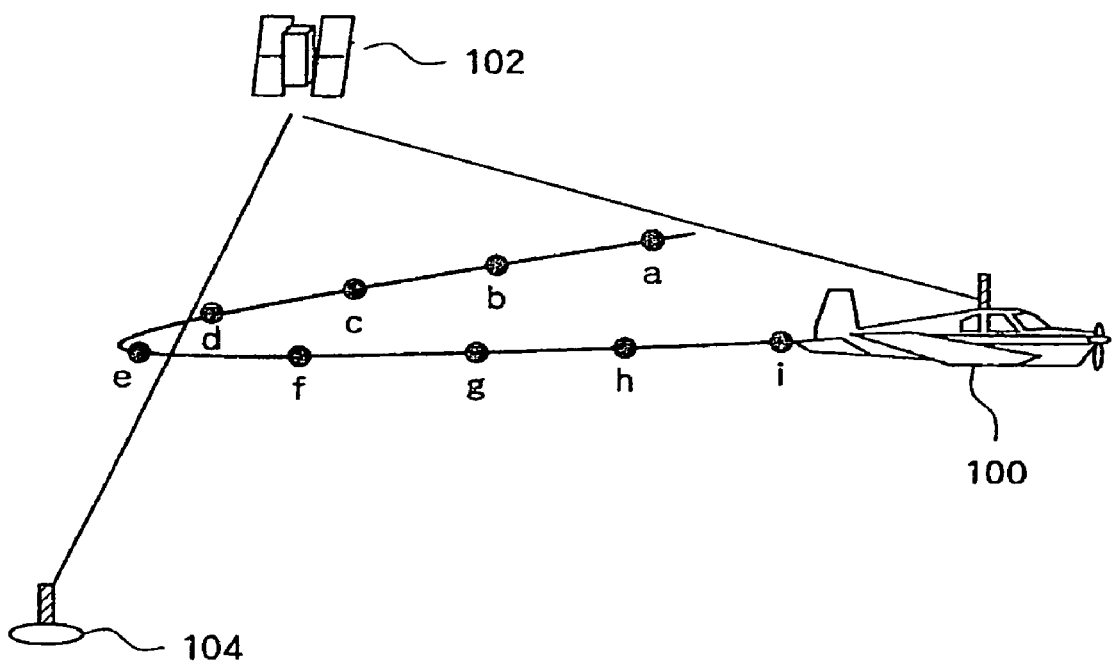
FIG. 2 is a diagram illustrating the case where a spatial information database generating device according to the invention is mounted in an aircraft and performs measurement of an ground surface.

FIG. 2 illustrates the case where the spatial information database generating device illustrated in FIG. 1 is mounted in an aircraft and measures an ground surface. In FIG. 2, among the components of the spatial information database generating device illustrated in FIG. 1, at least the optical camera 10, the laser measuring device 12, and the coordinate acquiring device 14 are mounted in an aircraft 100. The coordinate acquiring device 14 receives a predetermined signal from a GPS satellite (Navstar satellite) 102, and acquires coordinate information in cooperation with the IMU. At this time, the acquired coordinate information may be corrected using correction data from a GPS ground reference station (Geographical Survey Institute permanent GPS network station) 104.

The aircraft 100 flies over measurement areas and performs optical photographing and laser measurement on the ground surface at measurement points a, b, . . . , i, . . . using the optical camera 10 and the laser measuring device 12. The coordinate acquiring device 14 acquires coordinates at a point of time when the optical photographing and the laser measurement are performed. Thereby, the coordinate information can be associated with the optically photographed images and the laser measurement points.

Figure 3:
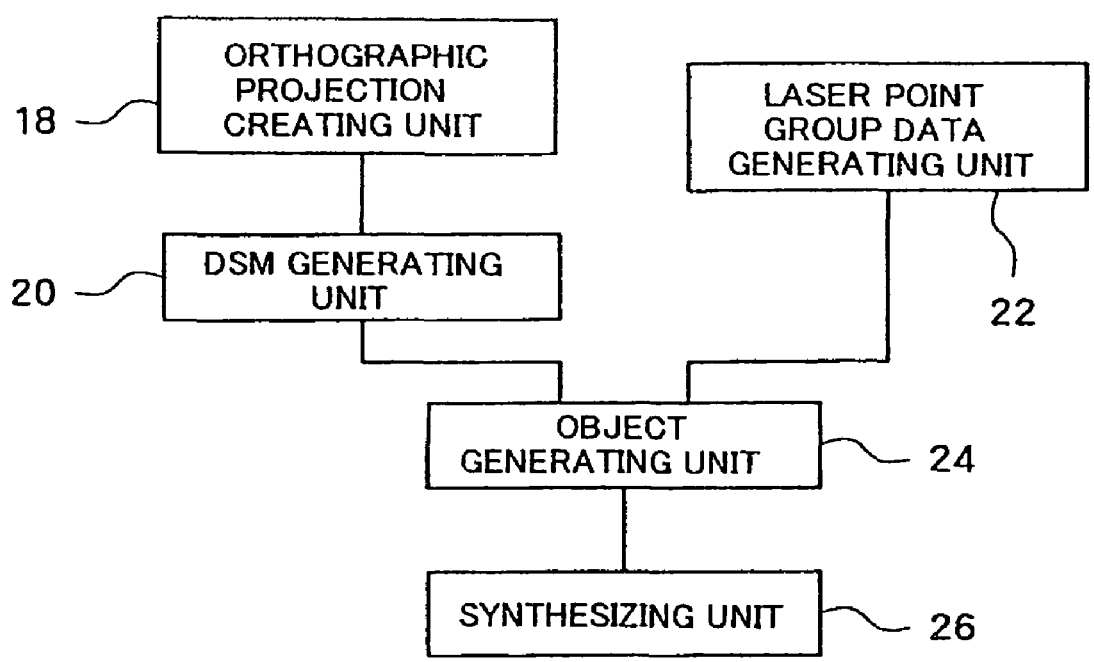
FIG. 3 is a functional block diagram of an embodiment of a control device illustrated in FIG. 1.

FIG. 3 is a functional block diagram of an embodiment of the control device 16 illustrated in FIG. 1. In FIG. 3, the control device 16 includes an orthographic projection creating unit 18, a DSM generating unit 20, a laser point group data generating unit 22, an object generating unit 24, and a synthesizing unit 26. Individual functions of the control device 16 may be realized by a central processing unit (e.g., a CPU may be used) and a program to control a process operation of the CPU, and may be implemented on a personal computer.

The orthographic projection creating unit 18 creates an orthographic projection image (true ortho image) from the optical image of the ground surface acquired by the optical camera 10. The orthographic projection image includes altitude information for every pixel.

The DSM generating unit 20 generates a Digital Surface Model (DSM) of the ground surface including buildings and trees and so on, using the altitude information of the orthographic projection image. In the orthographic projection image, since fall-down of the buildings that are present on the ground surface is not generated, the DSM can be easily generated.

The laser point group data generating unit 22 generates three-dimensional point group data based on a laser measurement result of the ground surface by the laser measuring device 12.

The object generating unit 24 groups the altitude data of the DSM generated by the DSM generating unit 20 and the altitude data of the three-dimensional point group data of the ground surface generated by the laser point group data generating unit 22 for each of the objects such as buildings.

The synthesizing unit 26 extracts coordinate information acquired by the coordinate acquiring device 14 for each of the altitude data of the DSM and the three-dimensional point group data grouped by the object generating unit 24, and synthesizes the optical image and the three-dimensional point group data for each of the objects based on the coordinate information. During the synthesizing process, the altitude information that is included in the optical image is replaced by high-accuracy altitude information of the three-dimensional point group data that is acquired by the laser measurement. As a result, an optical image having high-accuracy altitude information can be acquired, and a spatial information database having high accuracy can be generated.

Figure 4:
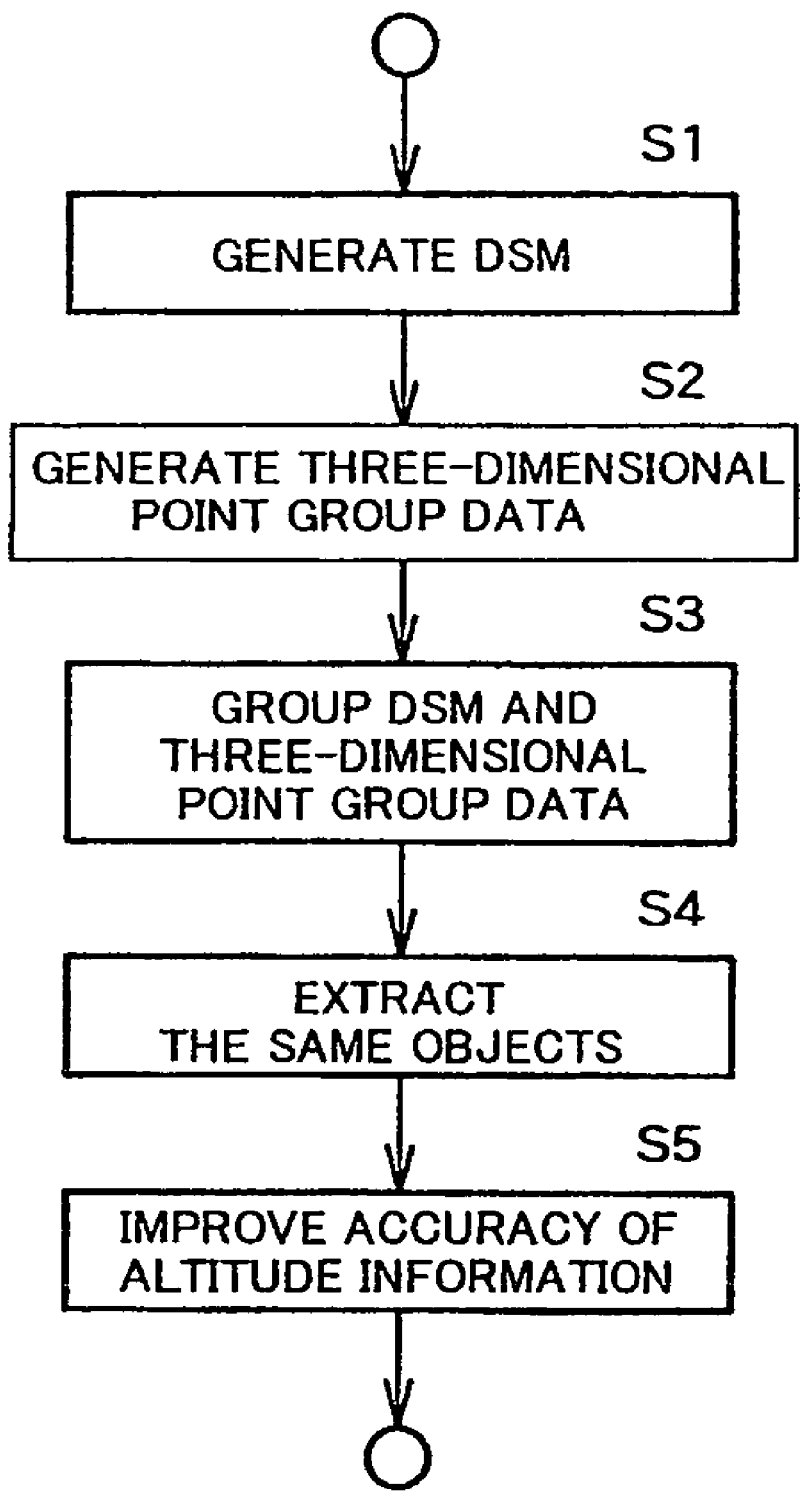
FIG. 4 is a diagram illustrating a flow of an operation example of the control device illustrated in FIG. 1.
Figure 5A:
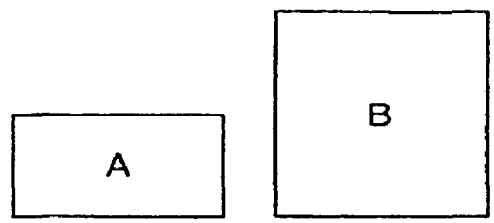
FIG. 5(a), (b), (c) are diagrams illustrating a synthesizing process of an optical image and three-dimensional point group data.

FIG. 4 illustrates a flow of an operation example of the control device 16. FIGS. 5(a), (b), and (c) illustrate a synthesizing process of an optical image and three-dimensional point group data in the control device 16. In FIG. 4, it is assumed that the optical image of the ground surface acquired by the optical camera 10 and the laser measurement result of the ground surface by the laser measuring device 12 are input to the control device 16.

In FIG. 4, the orthographic projection creating unit 18 creates the orthographic projection image from the optical image and the DSM generating unit 20 generates the DSM from the orthographic projection image (S1).

FIG. 5(a) illustrates an example of a DSM that is generated from an optical image of a measurement area where two buildings A and B are present. In the case of the optical image, a DSM where the contours of the buildings A and B are clear can be generated.

In FIG. 4, the laser point group data generating unit 22 generates three-dimensional point group data based on the laser measurement result of the ground surface by the laser measuring device 12 (S2).

Figure 5B:
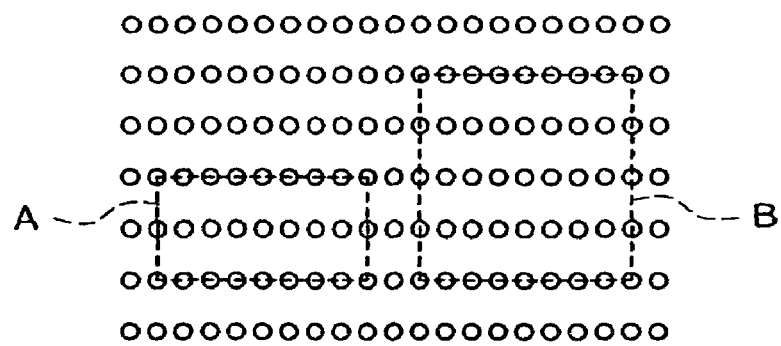

FIG. 5(b) is a conceptual diagram of the case where the same measurement area as that of FIG. 5(a) is subjected to the laser measurement. In the laser measurement, laser beams are irradiated onto the buildings A and B and peripheral portions thereof, and altitude information of irradiation points is acquired. The points (laser measurement points) where the altitude information is acquired are shown by white circles in FIG. 5(b).

Next, the object generating unit 24 groups the altitude data of the DSM and the altitude data of the three-dimensional point group data for each of the objects such as buildings (S3).

Figure 5C:
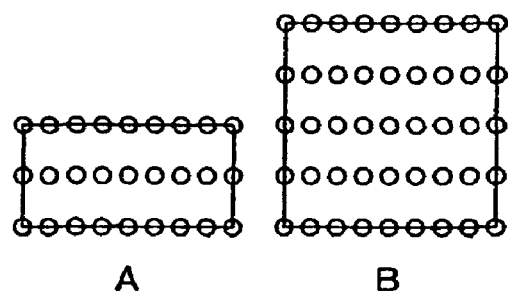

When the altitude data of the DSM is grouped, the buildings A and B illustrated in FIG. 5(a), for example, are recognized as separate objects. When the altitude data of the three-dimensional point group data is grouped, the laser measurement points on the buildings A and B are grouped, and groups of measurement points that respectively belong to the buildings A and B can be recognized as separated objects as illustrated in FIG. 5(c). As a result, the altitude data of the DSM and the altitude data of the three-dimensional point group data can be associated with each other for each of the objects having similarity.

Next, the synthesizing unit 26 extracts the same objects from the grouped altitude data of the DSM and three-dimensional point group data, and associates the objects with each other (S4). The association is made by determining whether position information (coordinates of the ground surface including ground coordinates) of the individual objects are matched with each other, using the coordinate information that is acquired by the coordinate acquiring device 14 and included in the optical image and the three-dimensional point group data. As a result, the buildings A and B of FIG. 5(a) and the buildings A and B of FIG. 5(c) can be associated with each other.

The synthesizing unit 26 replaces the altitude information, which is included in is the optical image, by the high-accuracy altitude information of the three-dimensional point group data acquired by the laser measurement, for each of the associated objects (S5).

By the above-described processes, a high-accuracy spatial information database where the high-accuracy altitude information acquired by the laser measurement is included in the optical image can be acquired.

Although the exemplary embodiment of the invention has been described above, many changes and modifications will become apparent to those skilled in the art in view of the foregoing description which is intended to be illustrative and not limiting of the invention defined in the appended claims.

The invention claimed is:

1. A spatial information database generating device, comprising:
    an optical image acquiring unit that acquires an optical image of an ground surface from a predetermined height;
    a laser measuring unit that acquires altitude information of an ground surface from a predetermined height by laser measurement;
    a coordinate acquiring unit that acquires coordinate information of a position where the optical image is acquired and a position where the laser measurement is performed; and
a synthesizing unit that synthesizes the optical image and the altitude information acquired by the laser measurement based on similarity between altitude information included in the optical image and the altitude information acquired by the laser measurement and based on the coordinate information, wherein the synthesizing unit creates an orthographic projection image from the optical image, groups altitude information of a digital surface model created from the orthographic projection image for each object, groups the altitude information acquired by the laser measurement for each object, and synthesizes the optical image and the altitude information acquired by the laser measurement based on the position information of each object.

2. A computer readable medium storing a program causing a computer to execute a process for spatial information database generating, the process comprising:
    creating an orthographic projection image from an optical image;
    grouping altitude information of a digital surface model created from the orthographic projection image for each object;
    grouping altitude information acquired by the laser measurement for each object; and
    synthesizing the optical image and the altitude information acquired by the laser measurement based on the position information of each object, wherein the synthesizing unit creates an orthographic projection image from the optical image, groups altitude information of a digital surface model created from the orthographic projection image for each object, groups the altitude information acquired by the laser measurement for each object, and synthesizes the optical image and the altitude information acquired by the laser measurement based on the position information of each object.

* * * * *